UNITED STATES PATENT OFFICE.

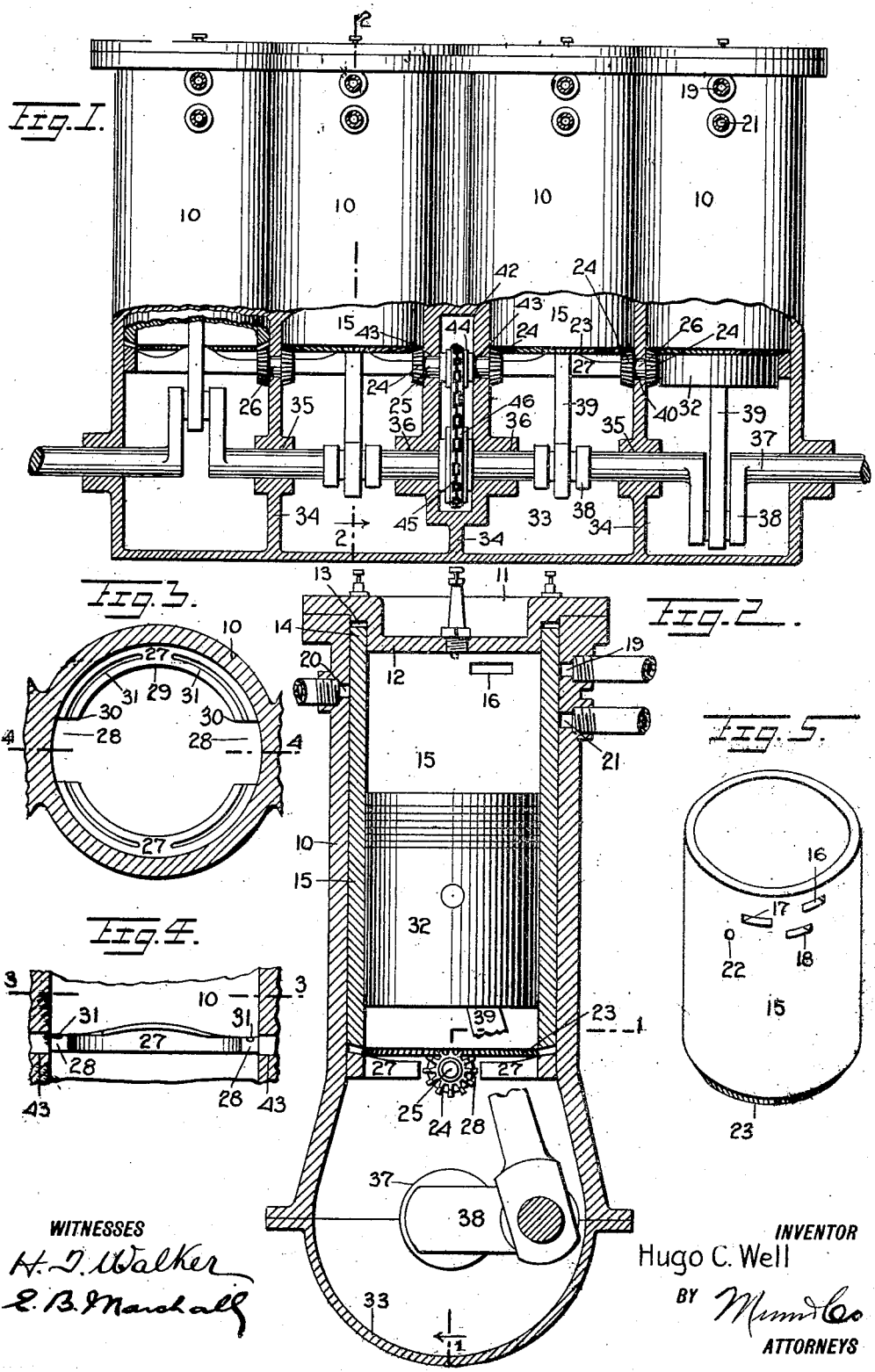

HUGO C. WELL, OF NEW YORK, N. Y., ASSIGNOR OF FIFTY ONE-HUNDREDTHS TO FREDERICK A. B. MEINHARDT, OF NEW YORK, N. Y.

VALVE MECHANISM FOR INTERNAL-COMBUSTION ENGINES.

1,213,316.  Specification of Letters Patent.  Patented Jan. 23, 1917.

Application filed August 24, 1915. Serial No. 47,070.

*To all whom it may concern:*

Be it known that I, HUGO C. WELL, a subject of the Emperor of Germany, and a resident of the city of New York, borough of the Bronx, in the county of Bronx and State of New York, have invented a new and Improved Valve Mechanism for Internal-Combustion Engines, of which the following is a full, clear, and exact description.

My invention has for its object to provide a valve mechanism for internal combustion engines having a valve sleeve which rests on ring members with grooves for conveying lubricant to gears disposed between the ring members, the gears meshing with the gear teeth on the sleeve for rotating the latter. Means are provided for driving one of the gears by the crank shaft, and as additional gears may be mounted on studs journaled in bearings between the cylinders, the valve sleeves in any given number of cylinders may be rotated, the bottom of the pistons within the valve sleeves passing down below the ring members and the gears to facilitate the distribution of the lubricant.

Another object of the invention is to space two of the cylinders apart and elongate the stud extending from one of the cylinders to the other and on which the gears are mounted which mesh with the gearing on the sleeves, this elongated stud being provided with a sprocket wheel with which is connected a sprocket wheel on the crank shaft by a sprocket chain for driving purposes.

Additional objects of the invention will appear in the following specification in which the preferred form of my invention is disclosed.

In the drawings similar reference characters refer to similar parts in all the views in which—

Figure 1 is a sectional view on the line 1—1 of Fig. 2; Fig. 2 is a sectional view on the line 2—2 of Fig. 1; Fig. 3 is a sectional view on the line 3—3 of Fig. 4; Fig. 4 is a sectional view on the line 4—4 of Fig. 3; and Fig. 5 is a perspective view of the valve sleeve.

By referring to the drawings it will be seen that the several engine cylinders 10 are cast *en bloc* and that disposed on the cylinders there is a head 11 having inwardly extending portions 12, one disposed in each of the cylinders 10. The sides of each of these inwardly extending portions 12 are spaced from the sides of the cylinder 10 to form annular grooves 13 in which are disposed the upper portions 14 of the valve sleeve 15, there being one of these valve sleeves 15 in each of the cylinders 10. These valve sleeves 15 have ports 16, 17 and 18 for uncovering the cylinder ports 19, 20 and 21 respectively, there being an additional port 22 for momentarily uncovering the cylinder port 21. The port 20 is the inlet port, the port 19 is the exhaust port and the port 21 is an air port through which air may be forced into the valve sleeve and out of the ports 16 and 19 to cleanse the interior of the valve sleeve, the port 22 in the valve sleeve 15 being provided to permit of forcing air into the valve sleeves immediately preceding the ignition of the explosive mixture. At its lower end the valve sleeves 15 are provided with gearing 23 with which mesh the gears 24 mounted on the studs 25 and 26. The valve sleeves are supported by the said gears 24 and by the ring members 27, there being two ring members 27 at the bottom of each of the sleeves 15, these ring members 27 being separated by the spaces 28 in which the gears 24 are disposed. As will best be seen by referring to Fig. 4 of the drawings each of the ring members 27 is inclined from its central portion 29 to its ends 30 and in the upper faces of these ring members there are lubricant grooves 31 which lead to the ends 30 at the openings 28 so that the lubricant will be conveyed by the ring members 29 to the openings 28 and the gears 24. It will be understood by referring to Fig. 1 of the drawings that the lower portions of the pistons 32 will reach positions below the ring members 29 and the gears 24 to assist in the distribution of the lubricant.

A crank case 33 is connected with the cylinders 10 and is disposed therebelow, this crank case 33 having partitions 34 in which there are bearings 35 and 36, a crank shaft 37 being journaled in these bearings and being provided with cranks 38 which are connected with the pistons 32 by the piston rods 39. In the end partitions 34 there are bearings 40 in which are journaled studs 26 having the gears 24 which mesh with the gearing 23 at the bottom of the valve sleeves 15 in the manner indicated above. The central partition 34 is provided with an opening 42 and with bearings 43 one at each side of this opening, the stud 25 being journaled in the said bearings 43. Secured to the stud 25 and disposed in the opening 42 there is a sprocket wheel 44. There is also a sprocket wheel 45 secured to the crank shaft 37, the sprocket wheels 44 and 45 being connected by a sprocket chain 46. By this means the stud 25 is rotated by means of the sprocket wheel, and the sprocket chain through the shaft 37 and the stud 25 serves to rotate the central valve sleeves 15, the said central valve sleeves 15 rotating by means of their gearing 23, the gears 24 and the studs 26, the outer valve sleeves 15. In this manner any desired number of valve sleeves may be rotated.

Having thus described my invention I claim as new and desire to secure by Letters Patent:

1. In a valve mechanism for internal combustion engines, a cylinder having a port, a valve sleeve commanding the port, gearing on the valve sleeve, a ring in the cylinder below the valve sleeve, there being a recess in the ring, a gear disposed in the recess and meshing with the gearing, and means to rotate the gear.

2. In a valve mechanism for internal combustion engines, a cylinder, a sleeve for rotating relatively to the cylinder and adapted to regulate the operation of the engine, gearing on the valve sleeve, a ring in the cylinder below the valve sleeve, there being a recess in the ring, a gear disposed in the recess and meshing with the gearing, and means to rotate the gear.

3. In a valve mechanism for internal combustion engines, a cylinder having a port, a valve sleeve commanding the port, gearing on the valve sleeve, a ring in the cylinder below the valve sleeve, there being a recess in the ring with a groove in the ring leading to the recess, a gear disposed in the recess and meshing with the gearing, and means to rotate the gear.

4. In a valve mechanism for internal combustion engines, a cylinder having a port, a valve sleeve in the cylinder commanding the port, gearing on the valve sleeve, a ring in the cylinder below the valve sleeve, there being a recess in the ring, a gear disposed in the recess, and meshing with the gearing, means to rotate the gear, and a piston for reciprocating in the valve sleeve from a position below the ring.

5. In a valve mechanism for internal combustion engines, a cylinder having a port, a valve sleeve in the cylinder commanding the port, gearing on the valve sleeve, a ring in the cylinder below the valve sleeve, there being a recess in the ring with the ring inclined in the direction of the recess, a gear disposed in the recess and meshing with the gearing, means to rotate the gear, and a piston for reciprocating in the valve sleeve from a position below the ring.

6. In a valve mechanism for internal combustion engines, a cylinder having a port, a valve sleeve commanding the port, gearing on the valve sleeve, a ring in the cylinder below the valve sleeve, there being a recess in the ring with a groove leading to the recess, a gear disposed in the recess and meshing with the gearing, means to rotate the gear, there being a bearing in the cylinder, and a spindle journaled in the bearing on which the gearing is mounted.

7. In a valve mechanism for internal combustion engines, a cylinder having a port, a valve sleeve commanding the port, gearing on the valve sleeve, a ring in the cylinder below the valve sleeve, there being a recess in the ring with a groove leading to the recess, a gear disposed in the recess and meshing with the gearing, means to rotate the gear, a piston in the sleeve for moving past the space between the sleeve and the ring.

8. In a valve mechanism for internal combustion engines, a cylinder having a port, a valve sleeve commanding the port, gearing on the valve sleeve, a ring in the cylinder below the valve sleeve, there being a recess in the ring, a gear disposed in the recess and meshing with the gearing, means to rotate the gear, and a piston in the sleeve for moving past the space between the sleeve and the ring.

9. In a valve mechanism for internal combustion engines, a cylinder having a port and a head extending into the cylinder and spaced from the side thereof, a valve sleeve in the cylinder extending into the said space and commanding the port, gearing on the valve sleeve, a ring in the cylinder below the valve sleeve, there being a recess in the ring, a gear disposed in the recess and meshing with the gearing, and means to rotate the gear.

10. In a valve mechanism for internal combustion engines, a cylinder, a valve sleeve for rotating coaxially with the cylinder, gearing on the valve sleeve, a gear meshing with the gearing, and a ring having lubricant-directing means for feeding a lubricant to the gear.

11. In a valve mechanism for internal combustion engines, two cylinders, two valve sleeves having gearing at their lower portions, one in each sleeve, a stud journaled in a bearing extending from one sleeve to the other, two gears secured to the stud, one disposed in each cylinder, the gears meshing with the gearing on the sleeves, two pistons, one piston for moving in each cylinder to a point below the stud, and means to rotate one of the sleeves.

In testimony whereof I have signed my name to this specification in the presence of the two subscribing witnesses.

HUGO C. WELL.

Witnesses:
EVERARD B. MARSHALL,
GEORGE H. EMSLIE.